United States Patent [19]

Abe

[11] Patent Number: 5,758,300
[45] Date of Patent: May 26, 1998

[54] DIAGNOSIS SYSTEM FOR MOTOR VEHICLES AND THE METHOD THEREOF

[75] Inventor: Kunihiro Abe, Higashi-Murayama, Japan

[73] Assignee: Fuji Jukogyo Kabushiki Kaisha, Tokyo, Japan

[21] Appl. No.: 902,643

[22] Filed: Jul. 30, 1997

Related U.S. Application Data

[63] Continuation of Ser. No. 444,697, May 19, 1995, abandoned.

[30] Foreign Application Priority Data

Jun. 24, 1994 [JP] Japan ................................ 6-143594
Jun. 24, 1994 [JP] Japan ................................ 6-143595

[51] Int. Cl.$^6$ ................................ G01M 17/00
[52] U.S. Cl. ................................ 701/33; 701/35
[58] Field of Search ................ 364/424.034, 424.037, 364/424.038, 424.04, 551.01; 73/116, 117.2, 117.3

[56] References Cited

U.S. PATENT DOCUMENTS

| | | | |
|---|---|---|---|
| 4,602,127 | 7/1986 | Neely et al. | 179/2 A |
| 4,796,206 | 1/1989 | Boscove et al. | 364/551.01 |
| 4,831,560 | 5/1989 | Zaleski | 364/551.01 |
| 4,857,716 | 8/1989 | Gombrich et al. | 235/462 |
| 5,029,183 | 7/1991 | Tymes | 375/1 |
| 5,072,391 | 12/1991 | Abe | 364/424.04 |
| 5,289,378 | 2/1994 | Miller et al. | 364/424.05 |
| 5,400,018 | 3/1995 | Scholl et al. | 340/825.54 |
| 5,442,553 | 8/1995 | Parrillo | 364/424.04 |
| 5,465,207 | 11/1995 | Boatwright et al. | 364/424.01 |
| 5,541,840 | 7/1996 | Gurne et al. | 364/424.03 |

FOREIGN PATENT DOCUMENTS

| | | |
|---|---|---|
| 1136045 | 5/1989 | Japan. |
| 1313773 | 12/1989 | Japan. |

*Primary Examiner*—Michael Zanelli
*Attorney, Agent, or Firm*—Martin A. Farber

[57] ABSTRACT

A wireless communication unit is built in a portable type diagnosing apparatus and an external computer respectively. The portable type diagnosing apparatus reads data from an electronic control unit of a vehicle and sends the data to the external computer by wireless. The external computer conducts miscellaneous calculations based on the data and displays the result of the calculations on a display of the external computer or analyzes failures of the vehicle in a running state. Further, when service manuals are needed, according to a command from the portable type diagnosing apparatus, they are sent from the external computer and displayed on a display of the portable type diagnosing apparatus.

5 Claims, 8 Drawing Sheets

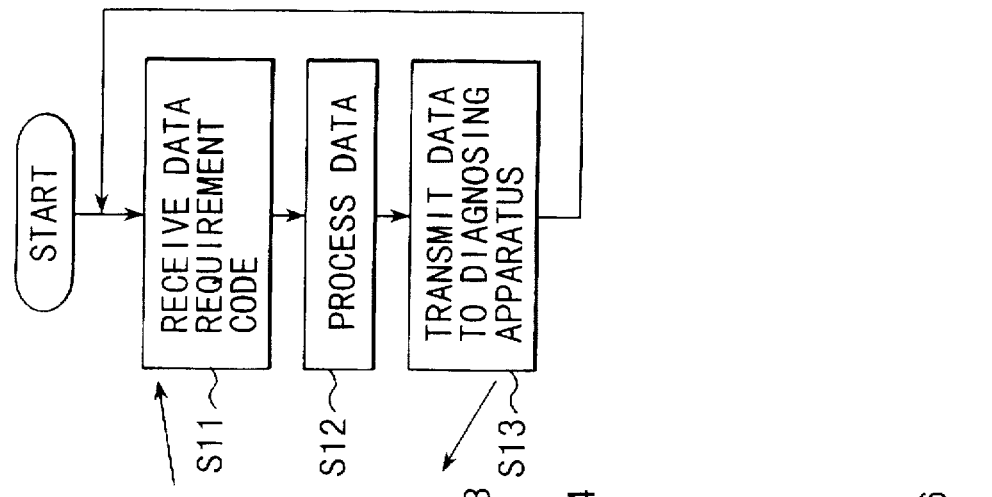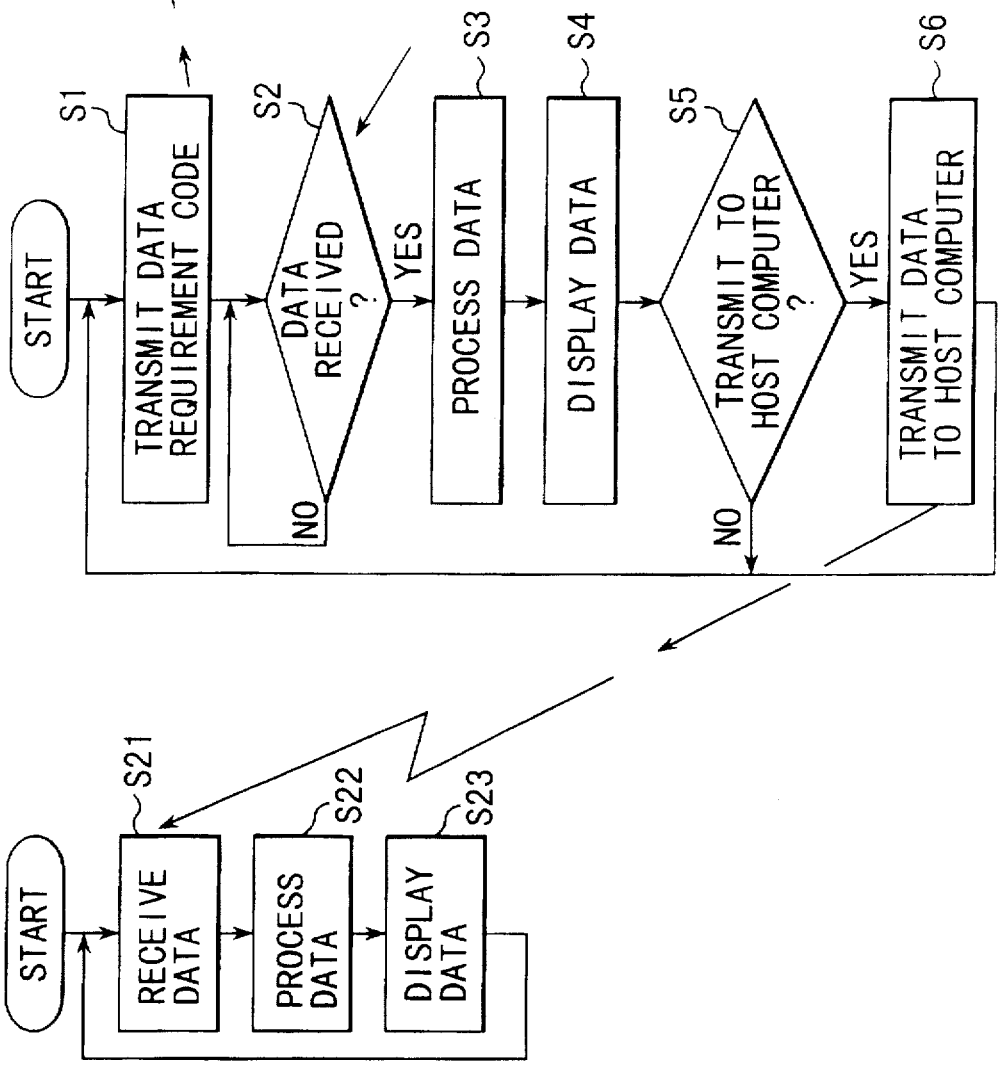

DIAGNOSIS SYSTEM FOR MOTOR VEHICLES AND THE METHOD THEREOF

RELATED APPLICATION

This application is a continuation of my application Ser. No. 08/444,697, filed May 19, 1995, now abandoned.

BACKGROUND OF THE INVENTION

1. Field of the Invention

The present invention relates to a diagnosis system and a method for a motor vehicle and more particularly to a portable type diagnosing apparatus utilizing an external computer.

2. Prior Arts

Motor vehicles in the state of the art have a control system which is sophisticatedly computerized and, therefore, when they are checked for diagnosis, it has been inevitable to use a portable type diagnosing apparatus (a so-called hand-held computer) capable of being connected to the vehicular control system so as to check input/output signals thereto and therefrom.

Generally in this portable type diagnosing apparatus, since its design philosophy is stressed on portability and wide use in order that a service mechanic can make a brief check on miscellaneous maintenance items while he is riding on a vehicle, there are such problems that the amount of displayed information is limited and it has no capability for calculating or analyzing detected data due to its small capacity.

For solving these problems, for example, Japanese Unexamined Patent Application, No. Toku-Kai-Hei 1-313773 discloses a diagnosis system in which the portable type diagnosing apparatus can be connected with an external computer through a connecting cable so as to transmit information which is unable be processed by this apparatus to the external computer for processing.

However, the diagnosis system according to this prior art has a disadvantage in that it is inconvenient to handle the system because it needs a cable communicating the portable type diagnosing apparatus with the external computer, although the diagnosis system enables more sophisticated diagnoses. That is, a service mechanic must wire between a work field where the diagnosing apparatus is located and a station where the computer is located. This may bring troubles or inconveniences during service works in the work field.

Furthermore, generally in diagnosing the vehicle, diagnoses are frequently performed in a running state of the vehicle in order to confirm failures by reproducing them in an actual use. In this case, the abovementioned diagnosis system is almost of no use because of the existence of the cable connecting the diagnosing apparatus and the external computer.

Next, when the service mechanic attempts to check the control system of the vehicle, he has to proceed diagnoses in accordance with a service manual. In this case, the service manual should be prepared nearby the service mechanic, because, while referring to the service manual, he must compare the miscellaneous data acquired through the diagnosing apparatus with the data or specifications described in the service manual to check an existence or non-existence of failures and to identify where failures are located.

Some of recent diagnosing apparatuses can display the contents of the service manual which are stored in a ROM cartridge inserted therein so as to proceed a diagnosis work according to the data or specifications displayed on the display of the diagnosing apparatus. The ROM cartridge can be selected in accordance with the diagnosis mode or the vehicle model.

However, in this type of diagnosing apparatus, it is troublesome and inefficient to replace the cartridge each time when the diagnosis mode is changed or when the vehicle being subjected to diagnosis is changed from one to the other model. Further, the capacity of a sheet of ROM cartridge is not enough to store manuals, data and specifications covering all diagnosis modes. To solve this problem of capacity, for example, a CD-ROM or the like can be considered as an alter native but in this case there is a problem in that the size of the apparatus inevitably becomes large, and as a result the portability of the diagnosing apparatus is lost.

A Japanese Unexamined Patent Application, Toku-Kai-Hei No. 1-136045, for example, discloses a technique in which the abovementioned ROM cartridge is connected to an external computer so as to expand the capacity of the diagnosing apparatus by reading the contents of the service manual stored in the external computer.

This diagnosis system also has the same disadvantages as those described before because it still needs a cable communicating the diagnosing apparatus with the external computer.

SUMMARY OF THE INVENTION

Accordingly, the present invention is intended to obviate the abovedescribed problems and disadvantages of the known diagnosis system and it is summarized as follows.

It is an object of the present invention to provide a portable type diagnosing apparatus capable of calculating and/or analyzing detected data without using a connecting cable.

A further object of the present invention is to provide a portable type diagnosing apparatus capable of diagnosing, calculating and analyzing in a running condition of the vehicle.

Another object of the present invention is to provide a portable type diagnosing apparatus capable of displaying related service information including service manuals, service bulletins and parts lists on a real-time base when diagnoses are performed.

The diagnosis system according to the present invention comprises: data reading means provided in a portable diagnosing apparatus for reading data from an electronic control unit; first data displaying means provided in the portable diagnosing apparatus for displaying the data; wireless data transmitting means provided in the portable diagnosing apparatus for transmitting the data by wireless; wireless data receiving means provided in an external computer for receiving the data by wireless; data processing means provided in the external computer for processing the data and outputting the processed data; and second data displaying means provided in the external computer for displaying the data.

The diagnosis system further comprises: data requiring command inputting means for inputting a data requiring command to the portable diagnosing apparatus; first wireless data transmitting means provided in the portable diagnosing apparatus for transmitting the command by wireless; second wireless data receiving means provided in the external computer for receiving the command by wireless; a data storing medium provided in the external computer for storing service data; retrieving means provided in the external computer for retrieving the service data from the data storing medium based on the command and outputting the service data; second wireless data transmitting means provided in the external computer for transmitting the service data by wireless; first wireless data receiving means provided in the portable diagnosing apparatus for receiving the service data by wireless; and first data indicating means provided in the portable diagnosing apparatus for indicating the service data.

According to those means thus constituted, the portable type diagnosing apparatus reads data from the electronic control unit installed on the vehicle and the data are transmitted to the external computer through a wireless communication unit built in the portable diagnosing apparatus and the external computer respectively. The external computer receives the data transmitted from the portable diagnosing apparatus and performs miscellaneous processes with respect to the data. Those processed data are displayed on the display of the external computer. Further, the diagnosis system according to the present invention, the portable type diagnosing apparatus is capable of sending a command to the external computer by wireless and receiving miscellaneous service information from the external computer by wireless. Received service information can be displayed on the display of the portable type diagnosing apparatus.

BRIEF DESCRIPTION OF THE DRAWINGS

A specific embodiment of the present invention will be described, with reference to the accompanying drawings, in which:

FIG. 2, comprising

FIGS. 4A, 4B and 4C constitute a flowchart showing a data communication process according to the present invention;

DETAILED DESCRIPTION OF PREFERRED EMBODIMENTS

Figure 1:
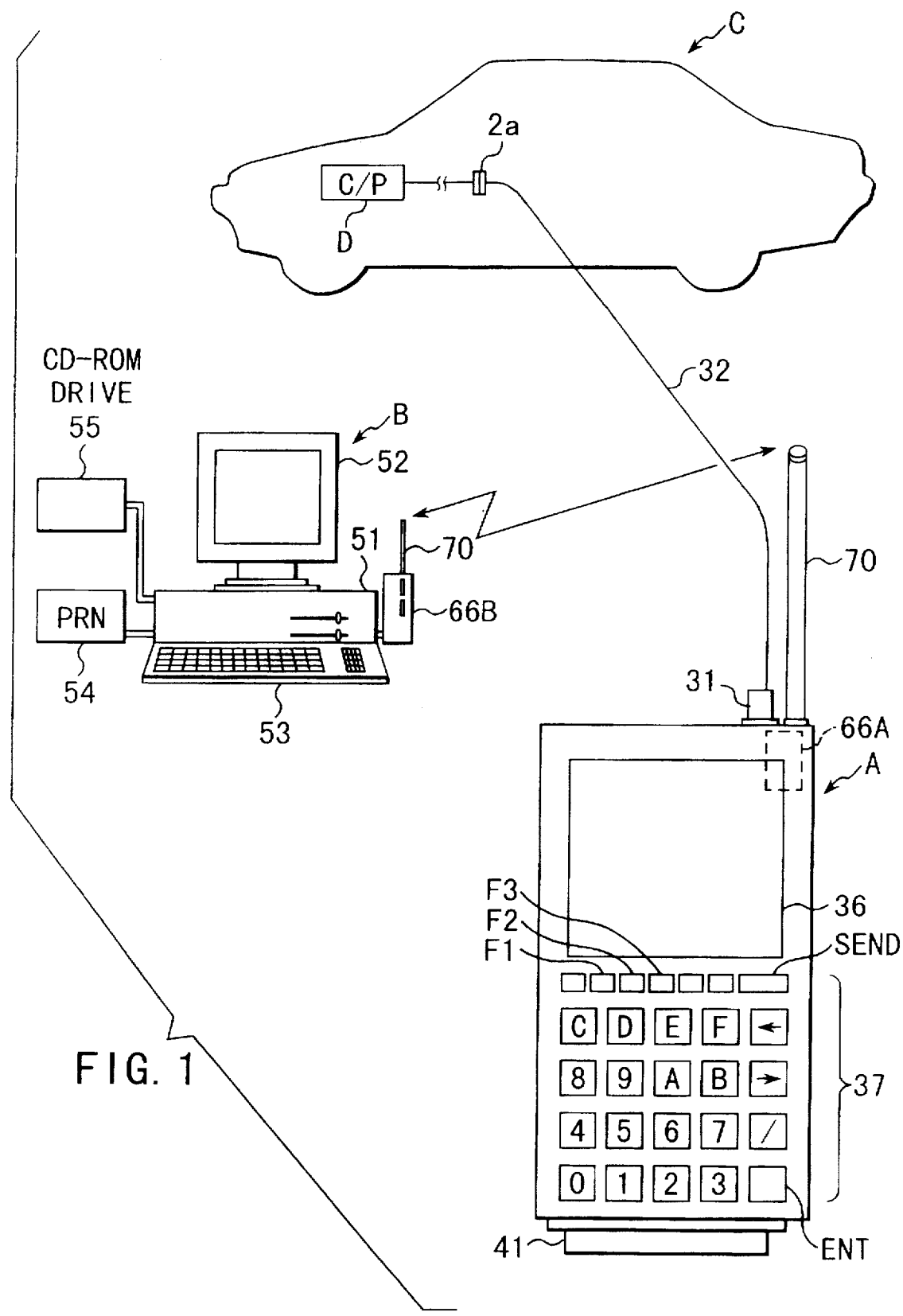
FIG. 1 is a schematic diagram showing a diagnosis system according to the present invention.

Referring now to FIG. 1, the diagnosis system according to the present invention comprises a portable type diagnosing apparatus (a so-called hand-held computer) A and a host computer B. This diagnosis system is employed in a service shop to diagnose an electronic control unit D installed on a vehicle C based on the data read from the electronic control unit D through an adapter harness 32 communicating an input/output connector 31 of the portable type diagnosing apparatus A with a connector 2a of the electronic control unit D.

As an example of the electronic control unit D in this embodiment, an engine control unit 2 for controlling an engine will be described by referring to FIG. 2.

The engine control unit 2 comprises a CPU 3, a ROM 4, a RAM 5, an input interface 6, an output interface 7, a busline through which these devices are connected with each other, a constant voltage circuit 8 and a driver circuit 9.

The data inputted via the input interface 6 are a coolant temperature signal $T_W$ detected by a coolant temperature sensor 10, a lean/rich signal $\lambda$ of the air-fuel ratio detected by an $O_2$ sensor 11, an intake air amount signal Q measured by an intake air amount sensor 12, an ON/OFF signal $SW_a$ of an air-conditioner switch 13, a vehicle speed signal S detected by a vehicle speed sensor 14, an ON/OFF signal $SW_I$ of an idling switch 15, a throttle opening angle signal $Tr\theta$ detected by a throttle opening angle sensor 16, an ON/OFF signal $SW_n$ of a neutral position switch 17, an engine speed signal N detected by an engine speed sensor 18 and the like.

These input data are stored in the RAM 5 temporarily and are used for the calculation of control variables. That is, in the CPU 3, miscellaneous control variables such as a fuel injection pulse width, an ignition timing and the like are calculated based on these data and control signals corresponding to these control variables are outputted from the output interface 7 to the driver circuit 9 at a specified timing. Then, these control signals are transformed into driver signals in the driver circuit 9. Then these driver signals are outputted to a canister control system 19, an EGR actuator 20 for controlling an EGR amount, an idling control actuator 21 for controlling an idling speed, an ignition coil 22 for energizing an ignition signal on a spark plug, a fuel injector 23 for metering and injecting a specified amount of fuel and other device to control the engine at an optimum condition in any operational area.

Next, the portable type diagnosing apparatus A will be described.

The portable type diagnosing apparatus A has a display 36 and a key board 37. Further, inside the apparatus, a diagnosis control section 38 composed of a CPU 42, a RAM 43, an I/O (input and output) interface 44, a busline through which these are connected with each other and an output circuit 45, and an electric power source circuit 39 are disposed as shown in FIG. 2.

Further, the diagnosis control section 38 is connected to a ROM cartridge 41 through a connector 40 for the purpose of a wide use, i.e., various diagnosis items and different vehicle models. The ROM cartridge 41 contains a ROM 41a wherein diagnosis items and diagnosis programs for different vehicle models are memorized.

Further, diagnosis mode signals which are inputted from the key board 37 enter into an input port of the I/O interface 44 and further, signals from the engine control unit 2 are inputted to this input port through the output interface 7. The output port of the I/O interface 44 is connected to the input interface 6 of the engine control unit 2 and to the display 36. The power source circuit 39 of the diagnosis control section 38 is connected to the battery $V_B$ of the vehicle C through the adapter harness 32.

On the other hand, as shown in FIG. 1, the host computer B comprises a control unit 51 wherein miscellaneous controls and calculations are carried out, a display 52 for displaying diagnosis data, collected data, analysis data and other data, and a key board 53 through which command data are inputted to the control unit 51. Further, the control unit 51 is connected with peripheral devices such as a printer 54 and a CD-ROM drive 55.

Figure 3:
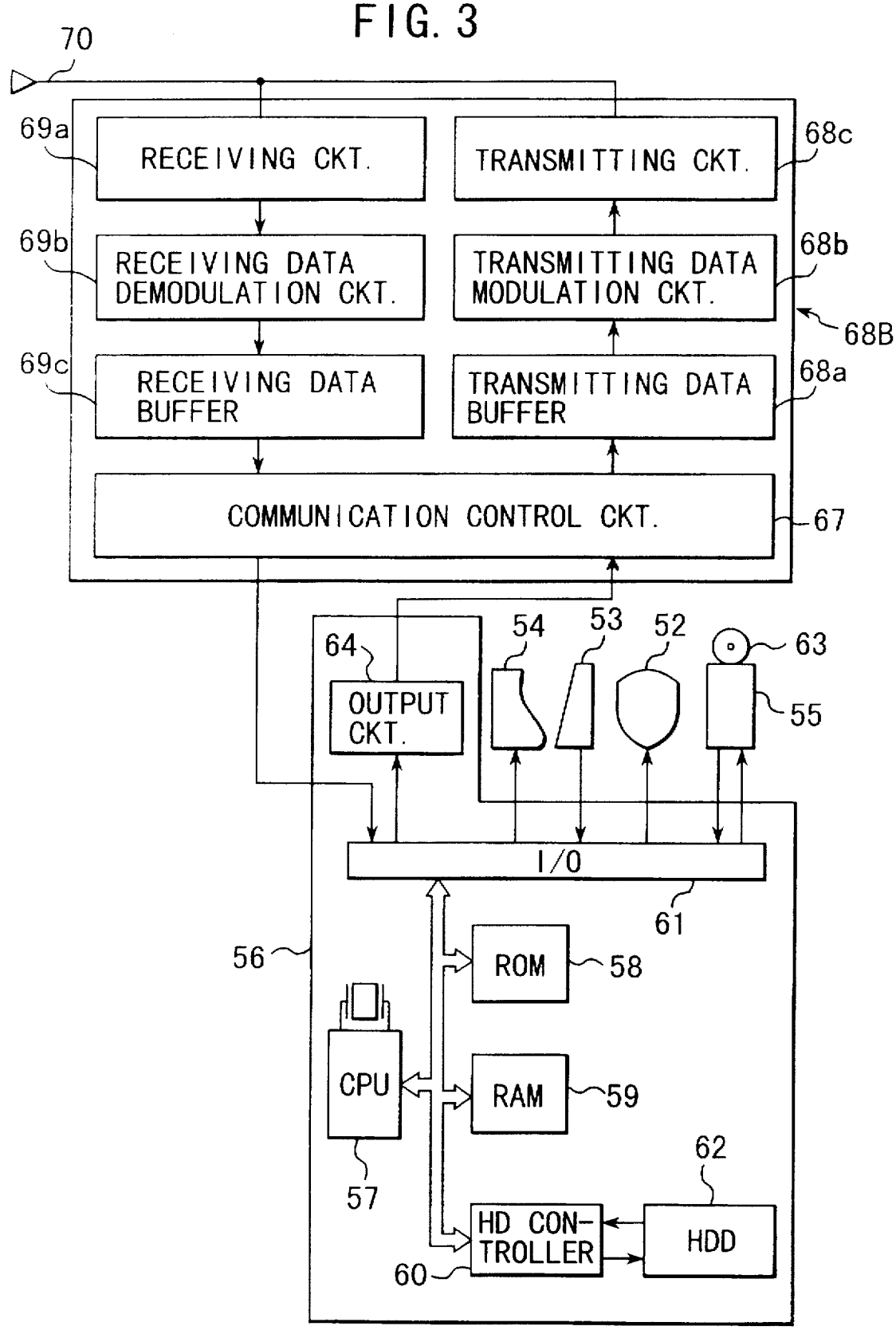
FIG. 3 is a block diagram in a host computer according to the present invention.

Referring to FIG. 3, an arithmetic and control section 56 in the control unit 51 comprises a CPU 57, a ROM 58, a RAM 59, a HD (hard disc) controller 60 and an I/O interface 61 connected to these devices through a bus line. The I/O interface 61 is connected with the abovementioned peripheral devices and the HD controller 60 is connected with a HDD (hard disc drive) 62 containing a hard disc on which the control program and the fixed data are stored. Further, the CD-ROM drive 55 drives a CD-ROM 63 storing miscellaneous electronic data such as work manuals and the like.

The diagnosing apparatus A and the host computer B are respectively equipped with a data communication unit 66A, 66B as transmitting and receiving means for performing data communication by wireless. As shown in FIG. 2 and FIG. 3, the output port of the I/O interface 44, 61 of the control section 38, 56 is respectively connected with an output circuit 45, 64 for outputting the data processed in the control section 38, 56 to the data communication unit 66A, 66B respectively. Further, the receiving data from the communication unit 66A, 66B are inputted to the input port of the I/O interface 44, 61 respectively.

On the other hand, the data communication unit 66A, 66B respectively comprise a communication control circuit 67, 67 for sending and receiving the data between the data communication unit 66A and 66B, a transmitting data buffer 68a, 68a for storing the transmitting data outputted from the communication control circuit 67 temporarily, a transmitting data modulation circuit 68b, 68b for modulating the transmitting data into signals fit for the data transmission and a transmitting circuit 68c, 68c for transmitting the modulated transmitting data to the data communication unit 66A, 66B respectively through an antenna 70, 70 by wireless, a receiving circuit 69a for receiving the transmitting data through the antenna 70, 70, a receiving data demodulation circuit 69b for demodulating this receiving data into signals fit for the processing in the control section 38, 56 and a receiving data buffer 69c, 69c for storing the demodulated receiving data temporarily.

Next, an exemplary procedure for communicating between the engine control unit 2, the portable type diagnosing apparatus A and the host computer B will be described according to a flowchart in FIGS. 4A, 4B and 4C. Here, FIG. 4(A) shows steps to be taken in the portable type diagnosing apparatus A. FIG. 4 (B) does steps to be done in the engine control unit 2 and FIG. 4 (C) does steps to be done in the host computer B.

First, the service mechanic riding on the vehicle C subjected to diagnoses connects the portable type diagnosing apparatus A to the engine control unit 2 of the vehicle C through the adapter harness 32.

Then, the service mechanic inputs an item of the data to be read out or the data to be detected in accordance with an index of the work manual through the key board 37. For example, if he wants to confirm a fuel injection pulse duration (fuel injection pulse width), he inputs F1 2 ENT. Then, at a step S1 a command (item) inputted from the key board 37 is transformed into a data requiring code by which an address of the RAM 5 storing the required data in the engine control unit 2 is designated and the data requirement code is transmitted to the engine control unit 2.

In the engine control unit 2, at a step S11 the data requirement code transmitted from the diagnosing apparatus A is received. At a step S12 the data stored in an address are read out by retrieving an address corresponding to this data requirement code and are transformed into a format fit for the data transmission. Next, at a step S13 the data are transmitted to the portable type diagnosing apparatus A.

In the diagnosing apparatus A, when at a step S2 it is judged that the data have been received, the program goes to a step S3 where the data are subjected to the miscellaneous processes such as a transformation into physical quantity. Then, at a step S4 those processed data are displayed on the display 36 of the diagnosing apparatus A. For example, in case of the fuel injection pulse width, a fuel injection pulse duration time is displayed in figures on the display 36.

Figure 5:
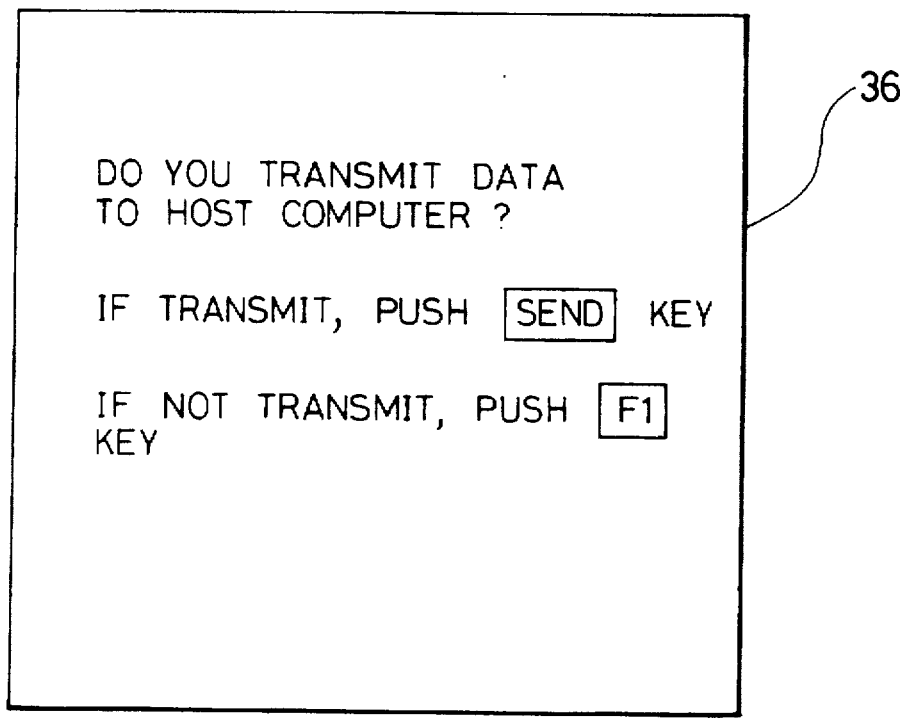
FIG. 5 is a drawing showing an example of a message to be displayed on the portable type diagnosing apparatus.

Next, at a step S5 it is judged whether or not those data should be sent to the host computer B. In this embodiment, for example, such a message as shown in FIG. 5 appears on the display 36. If the mechanic wants to send, he pushes a [SEND] key and if does not he pushes a [F1] key. In case of pushing the [F1] key, the data are not sent and accordingly the program returns to the step S1. In case of pushing the [SEND] key, the program goes to a step S6 where the data are sent to the host computer B and after that the program returns to the step S1.

Returning to the step S1, the command already inputted is executed automatically and therefore updated information is always displayed on the display 36 of the diagnosing apparatus A. Further, while the sending command is outputted to the host computer B, the data are continued to be sent to the host computer B in time series. When a new command is inputted or a resetting operation is made, the data sending from the diagnosing apparatus A to the host computer B is also reset.

In the diagnosing apparatus A, the data to be sent are outputted from the output circuit 45 of the diagnosis control section 38 to the communication control circuit 67 of the data communication unit 66A. The data are stored in the buffer 68a temporarily and then the data are sent to the host computer B through the antenna 70 by wireless after being modulated in the transmission data modulation circuit 68b.

In the host computer B, the data sent from the diagnosing apparatus A are received by the receiving circuit 69a of the data communication unit 66B and stored in the receiving data buffer 69c temporarily after being demodulated in the receiving data demodulation circuit 69b. Then, the data are inputted to the arithmetic and control section 56 of the host computer B through the communication control circuit 67.

When the data are inputted to the arithmetic and control section 56, in the host computer B, at a step S21 the data are inputted and at a step S22 the data are subjected to miscellaneous processes such as being aggregated, calculated or statistically processed. Then at a step S23 the results of the processes are displayed on the display 52 and the process returns to the step S21.

Thus, the host computer B can diagnose failures sophisticatedly by aggregating or analyzing the data which can not be processed in the portable type diagnosing apparatus A. Further, in this host computer B, since the data are transmitted from the portable type diagnosing apparatus A by wireless, the data can be acquired on a real-time base from the vehicle C in a running condition. As a result, failures can be reproduced more easily. Additionally, since the data can be sent by wireless, no wire arrangement is needed on the floor of the work shop and therefore cables do not hamper the people coming up and down in the work shop. Further, in this wireless diagnosis system, since plural diagnosing apparatuses A can be operated simultaneously per one host computer B, work efficiency is largely improved.

In the first embodiment described before, the data transmission is performed only from the portable type diagnosing apparatus A to the host computer B.

In a second embodiment mentioned hereinafter, a diagnosis system capable of communicating mutually between the diagnosing apparatus and the host computer will be described. Following explanation is an example of the processes to be taken in the second embodiment according to the present invention.

Figure 6A:
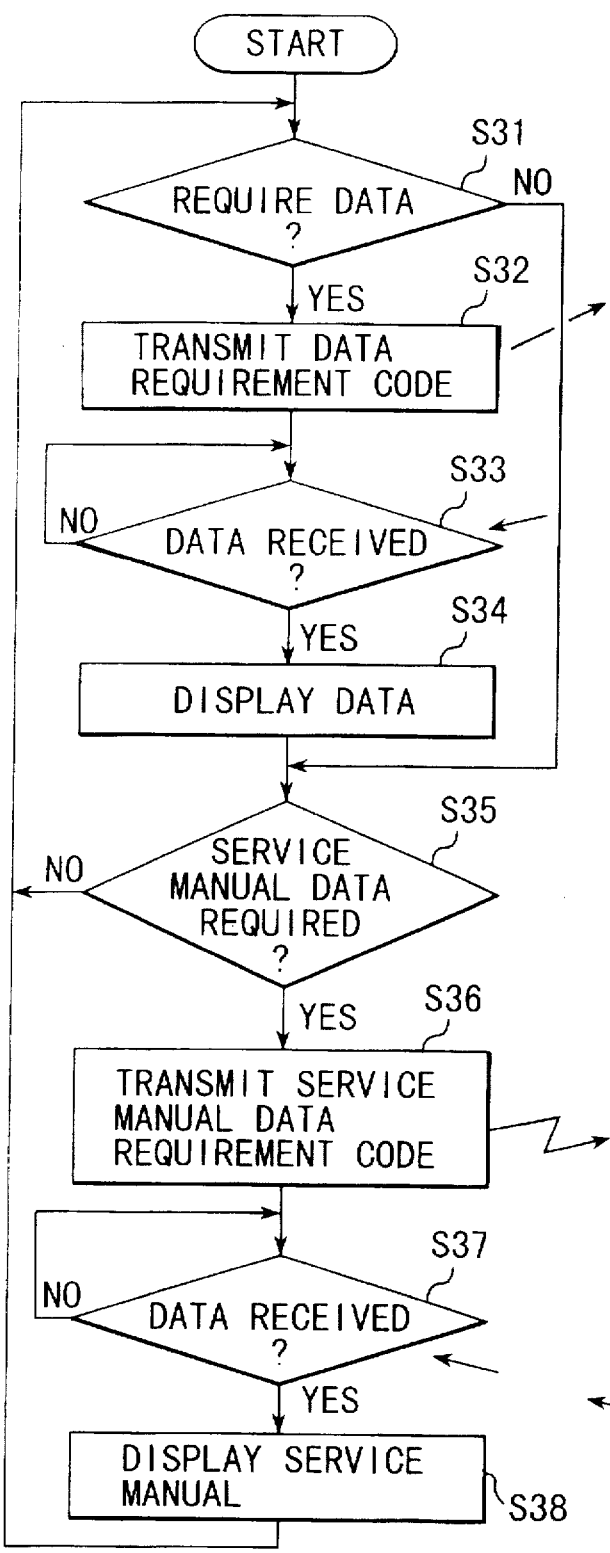
FIGS. 6A, 6B and 6C constitute a flowchart showing a data communication process according to another embodiment of the present invention.
Figure 6B:
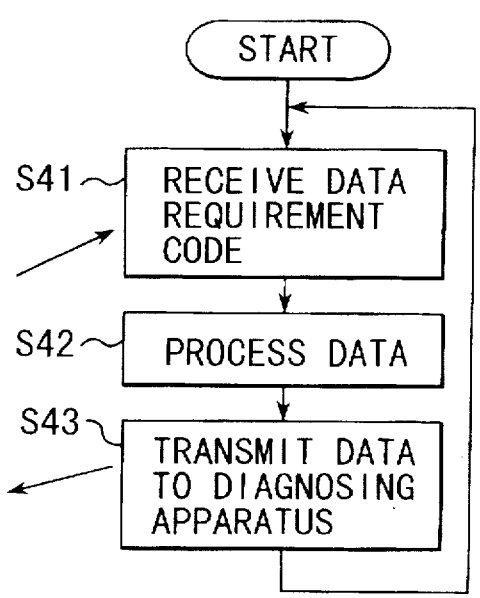
Figure 6C:
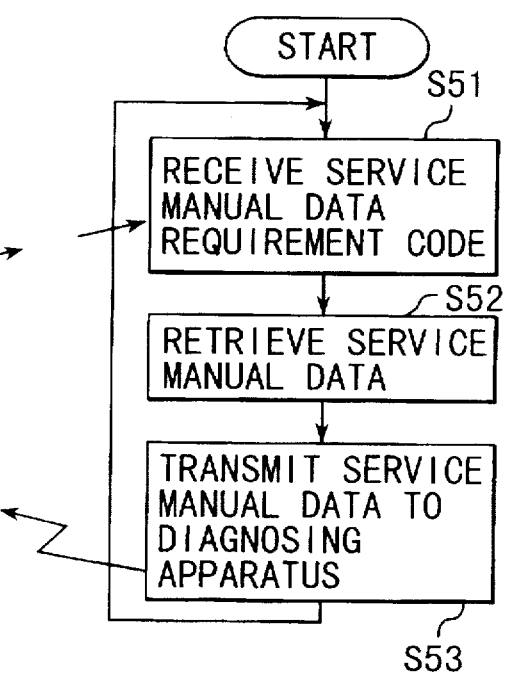

The service mechanic connects the portable type diagnosing apparatus A with the engine control unit 2 through the adapter harness 32. Referring to FIGS. 6A–6C, when a switch (not shown) is turned on, at a step S31 it is judged whether or not the data are required to the engine control unit 2. At this moment, a message showing whether or not the data are required to the engine control unit 2 is displayed on the display 36 of the diagnosing apparatus A. He inputs a command (a [1] key if required and a [0] key if not required).

If "data required" is chosen, the program goes to a step S32 where the command corresponding to the kind of data is inputted through the key board 37. For example, in case where the data of the fuel injection pulse duration time (fuel injection pulse width) are needed, he inputs F1 2 ENT. Then, the above command is converted into a data requirement code by which the address of the RAM 5 storing the subject data is designated and is transmitted to the engine control unit 2.

On the other hand, if "data not required" is chosen, the program skips to a step S35.

When "data required" is chosen at the step S31 and the data requirement code is transmitted at the step S32, at a step S41, in the engine control unit 2 the data requirement code is received. Further, at a step S42 an address corresponding to the data requirement code is retrieved, the data stored therein are read out and processed into a format fit for the data transmission. At a step S43 the processed data are sent back to the diagnosing apparatus A.

In the portable type diagnosing apparatus A, at a step S33 when it is judged that the data has been sent from the engine control unit 2, the program steps to a step S34 where the data themselves, the calculated data or the data converted into physical quantity are displayed on the display 36. For example, if the data of the fuel injection pulse width have been required at the step S32, the fuel injection pulse duration time is displayed in figures on the display 36.

The program goes to a step S35 from the steps S31 or S34. Here in this step S35, for example, it is judged whether or not a service manual is required to be sent from the host computer B. In this embodiments a service manual is required, however information required to be sent from the host computer B may be any information other than the service manual. The information required here includes a service manual, a service bulletin, a parts List and other information associated with service work. In this case a message whether or not a service manual is required is indicated on the display 36. The mechanic inputs a command (a [1] key if required and a [0] key if not required) according to the message.

In a case where it is judged that the service manual is not required, the program returns to the step S31 in which a new command waits for being inputted. On the other hand, in a case where it is judged that a service manual is required, the program goes to a step S36 where a command requiring the service manual is inputted through the key board 37 and the command is sent to the host computer B by wireless after being converted into a service manual requirement code. At the next step S37 the program waits for the service manual being sent from the host computer B.

The service manual requirement code is sent from the output circuit 45 of the diagnosis control section 38 to the communication control circuit 67 of the data communication unit 66A and stored in the transmission data buffer 68a temporarily. After this requirement code is modulated into a signal fit for the data transmission in the transmission data modulation circuit 68b, it is sent from the transmission circuit 68c by wireless through the antenna 70.

This data sent by wireless is received by the receiving circuit 69a of the data communication unit 66B in the host computer B through the antenna 70 and is stored temporarily in the receiving data buffer 69c, after being demodulated by the receiving data demodulation circuit 69b. After that the data are inputted to the arithmetic and control unit 56 of the host computer B through the communication control circuit 67.

When the service manual requirement code is received at a step S51 in the host computer B, at the next step S52 the object service manual is retrieved. In the CD-ROM 63 of the host computer B various service manuals are stored. When a requirement of the service manual is transmitted from the diagnosing apparatus A, in the host computer B the object service manual is searched by driving the CD-ROM drive 55. The service manuals may be memorized in an internal memory, a hard disc or other storage medium retrieved by peripheral devices.

Further, at a step S53 the object service manual retrieved at the step S52 is sent back to the diagnosing apparatus A. That is to say, as illustrated in FIG. 3, the service manual data are sent to the data communication unit 66B through the communication control circuit 67 and stored temporarily in the transmission data buffer 68a. Further, these data are sent from the transmission circuit 68c by wireless through the antenna 70, after being modulated into signals fit for the data transmission.

Figure 2A:
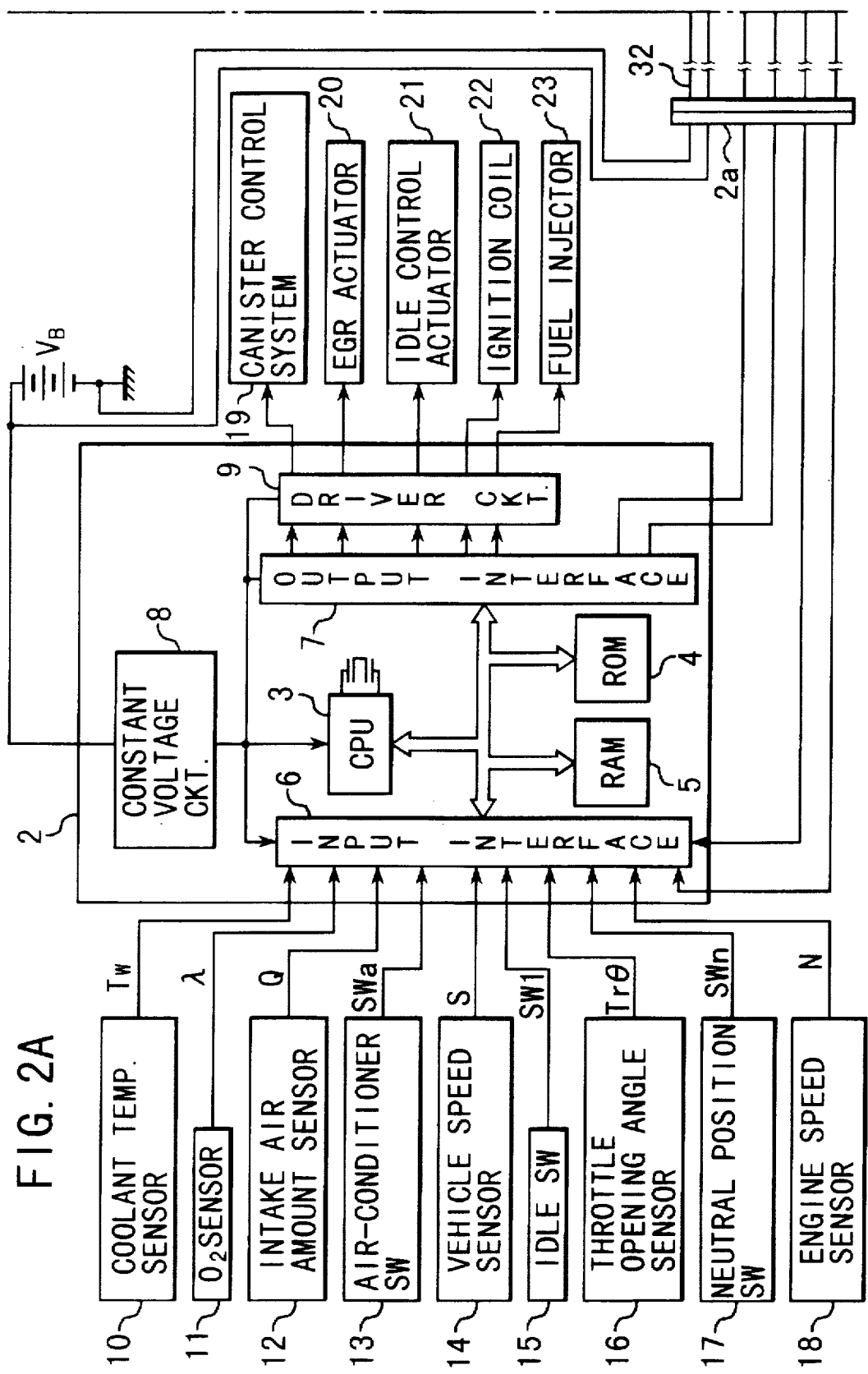
FIGS. 2A and 2B, is a block diagram showing the relationship between a diagnosing apparatus and an electronic control unit of a vehicle according to the present invention.
Figure 2B:
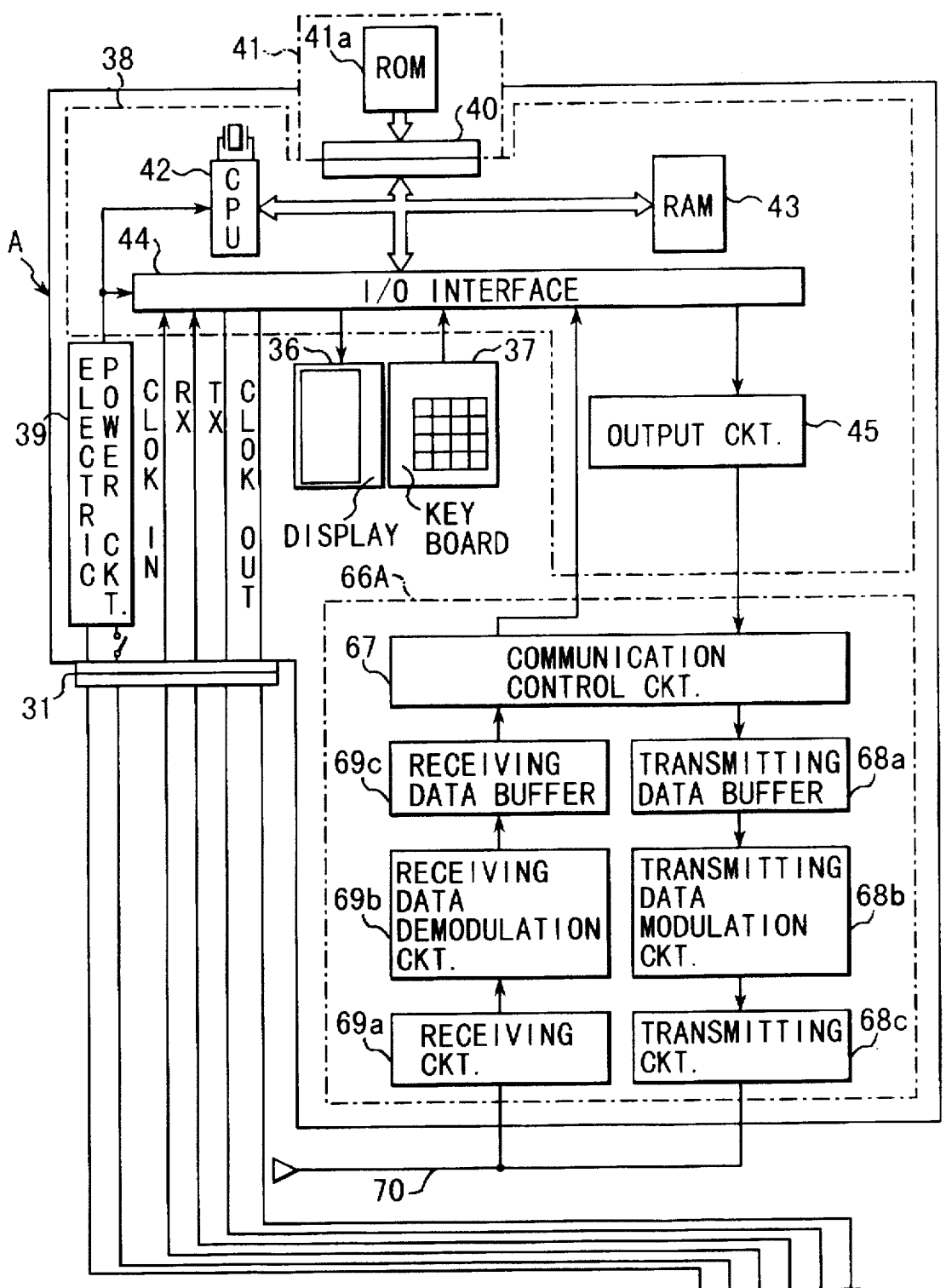

The data sent by wireless, as shown in FIG. 2, are received by the receiving circuit 69a of the data communication unit 66A through the antenna 70 and are stored temporarily in the receiving data buffer 69c after being demodulated by the receiving data demodulation circuit 69b.

Further, in the diagnosis control section 38 of the portable type diagnosing apparatus A, at a step S37 when it is judged that the object service manual data have been received, the service manual data are stored in the RAM 43 and at the next step S38 they are displayed on the display 36. Then the program returns to the step S31.

Figure 7:
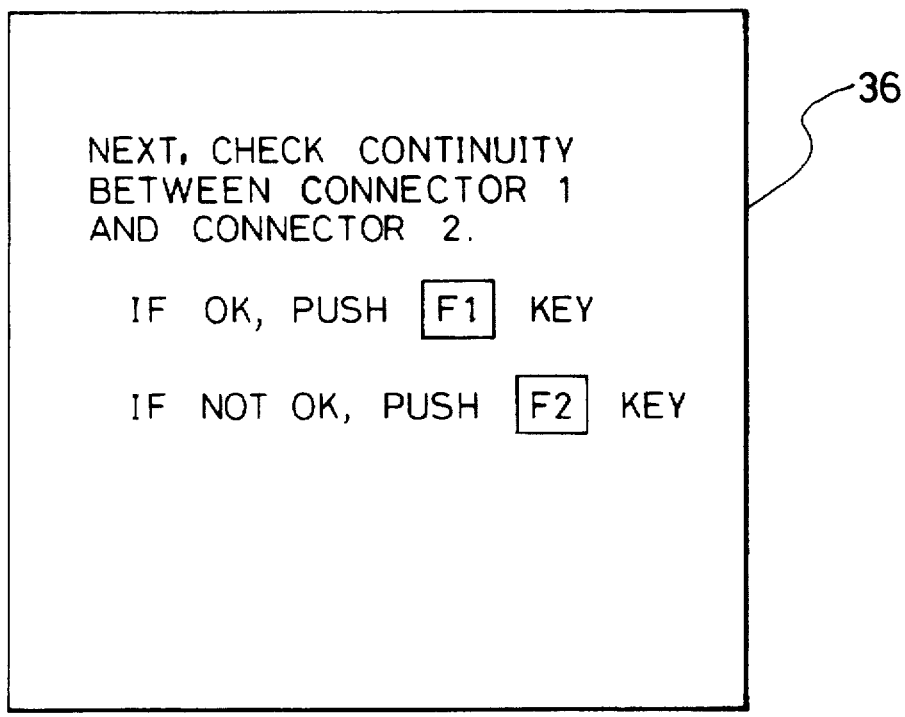
FIG. 7 is a drawing showing an example of a message to be displayed on the portable type diagnosing apparatus according to another embodiment of the present invention.

The service mechanic manipulates the key board 37 of the diagnosing apparatus A according to an instruction in the service manual shown in FIG. 7 and performs various diagnoses works such as reading the necessary data in the engine control unit 2, displaying the data on the display 36, checking whether or not the obtained data are proper by comparing them with the criteria of the service manual and inputting measured values to the key board 37.

Thus, in the second embodiment according to the present invention, since the service manual data can be read in a remote place whenever needed, the diagnosis and maintenance works become more convenient and more efficient.

In this embodiment, as an example of the electronic control system installed on the vehicle, the engine control unit 2 has been described, however the electronic control system is not limited to the engine control unit, and for example, other electronic control units such as a transmission control unit, a brake control unit, automatic cruise control unit, an air-conditioner control unit and the like, may be objects of diagnoses.

Further, in this embodiment the service manuals are stored in the host computer, however they may be stored in another external computer forming a computer network.

In summary, according to the present invention, since the portable type diagnosing apparatus can not only read data from the electronic control unit of the vehicle but also send the data to the external computer from a remote place or from the vehicle in a running state by wireless and display the data processed in this external computer on the display of the portable type diagnosing apparatus, more extended and more efficient diagnosis works are available. Further, since service related information, such as service manuals and service bulletins can be displayed on the display of the portable type diagnosing apparatus whenever needed, such troublesome and time-consuming work in that the service mechanic goes back to an office each time when he wants to examine service manuals or service bulletins can be saved.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A diagnosis system for a motor vehicle having an electronic control unit, comprising:

a diagnosis apparatus selectively connected to said electronic control unit through a wire harness for bi-directional communication therebetween; and an external computer provided to perform wireless communication with said diagnosis apparatus, the external computer having a medium storing service-related information;

wherein said diagnosis apparatus has a keyboard for an operator to input a command, a microprocessor responsive to said input command for performing the bi-directional communication with said electronic control unit to obtain operational data of said electronic control unit and additionally performing upon selection of one possible command the wireless communication with said external computer to obtain only an object part of said service-related information relating to said obtained operational data, and a display for sequentially indicating said obtained data and said obtained service-related information.

2. The system according to claim 1, wherein said medium of said external computer provides service related information in the form of service manual data.

3. The system according to claim 1, wherein said medium of said external computer provides service-related information in the form of service bulletins.

4. The system according to claim 1, wherein said medium of said external computer provides service-related information in the form of parts lists.

5. A method of diagnosing failures of a vehicle having an electronic control unit, comprising:

connecting a diagnosis apparatus with said electronic control unit;

inputting a command through a keyboard of said diagnosis apparatus to obtain operational data of said electronic control unit by means of bi-directional communication, said obtained operational data being indicated on a display of said diagnosis apparatus; and inputting a next command upon selection of one possible command through said keyboard on said diagnosis apparatus to obtain only an object part of service-related information relating to said obtained operational data from an external computer by means of wireless communication between said diagnosis apparatus and said external computer, said obtained object service-related information being subsequently indicated on said display for the guidance of effective diagnosis of said obtained data.

* * * * *